United States Patent [19]

Delmer

[11] 4,354,639

[45] Oct. 19, 1982

[54] MULTIPLE CHAMBER DRIP IRRIGATION HOSE

[76] Inventor: William M. Delmer, 16901 Bedford La., Huntington Beach, Calif. 92649

[21] Appl. No.: 118,721

[22] Filed: Feb. 5, 1980

Related U.S. Application Data

[63] Continuation-in-part of Ser. No. 861,119, Dec. 16, 1977, Pat. No. 4,196,853.

[51] Int. Cl.3 .............................................. B05B 15/06

[52] U.S. Cl. ...................................... 239/542; 239/116

[58] Field of Search ............... 239/542, 116, 145, 450, 239/547, 106, 114, 115; 138/42, 215

[56] References Cited

U.S. PATENT DOCUMENTS 3,799,442 3/1974 Delmer ................................ 138/42

4,196,853 4/1980 Delmer ................................ 239/116

*Primary Examiner*—James B. Marbert

[57] ABSTRACT

A multiple chamber drip irrigation hose for distributing irrigation water and the like comprising, in combination, a primary and at least one secondary tube of flexible, water-impermeable material and joined at a common wall. Said common wall has a series of first holes placing the interior of said primary tube in communication with the interior of said secondary tube. Said secondary tube has a series of second holes leading from the interior of said secondary tube to the exterior. A flexible, filamentary line is positioned within said secondary tube and forms a restricted path for water flowing from a first hole to a second hole. Optionally, at least one tertiary tube of flexible, water-impermeable material is joined to said secondary tube at a second common wall, with said second holes through said second common wall. Said tertiary tube has a series of third holes leading from the interior of said tertiary tube to the exterior and a flexible, filamentary line is positioned within said tertiary tube.

8 Claims, 12 Drawing Figures

MULTIPLE CHAMBER DRIP IRRIGATION HOSE

CROSS-REFERENCE TO RELATED APPLICATION

This application is a continuation-in-part of my copending application Ser. No. 861,119, filed Dec. 16, 1977 now U.S. Pat. No. 4,196,853.

BACKGROUND OF THE INVENTION

The present invention relates in general to an apparatus for distributing irrigation water, and more particularly to a self-cleaning, drip-type irrigation apparatus for applying water at very low levels.

Heretofore, drip irrigation systems have been used to apply water to crops at much lower levels than would be possible using other methods of irrigation, such as sprinkling and flooding. Although the known drip irrigation systems applied water at much lower levels than the non-drip irrigations systems, they had a tendency to plug up from suspended solids in the water supply, from sucking in dirt when the system was shut down and subsequently draining, and from salt build up in the exterior holes as the water evaporated causing them to plug up. This necessitated the filtration of the water supply, which was a costly procedure. In addition, should silt get into the system, it was difficult to remove.

Manufacturing problems were frequently encountered, since many systems employed restrictive holes for the purpose of controlling the amount of water supplied. The restrictive holes were prone to blockage by suspended solids in the water supply. The restrictive holes also increased in size with use due to erosion of the material surrounding the opening.

The removal of low cost irrigation systems from buried locations after there was no more need for the system in the original location frequently presented a problem. These systems often lacked sufficient internal strength to be removed in tact. This resulted in a twofold increase in costs since the system could not be reused in its entirety and additional expenses were incurred in its removal.

Patents of interest are: U.S. Pat. No. 3,903,929 to Mock for Irrigation Conduit, U.S. Pat. No. 3,698,195 to Chapin for Water Distributing Hose, U.S. Pat. No. 2,798,768 to Babin for Soil Moistening Apparatus, U.S. Pat. No. 3,777,987 to Allport for Irrigation Device, U.S. Pat. No. 3,799,441 to Delmer for Solid Pellet and Self-Cleaning Irrigation Device, U.S. Pat. No. 3,799,442 to Delmer for Fiber Self-Cleaning Irrigation Device, U.S. Pat. No. 2,769,668 to Richards for Irrigation Tubes, U.S. Pat. No. 3,021,642 to Ewing for Lawnmower Attachment for Distributing Liquid, U.S. Pat. No. 3,116,019 to Graef for Irrigating Attachment for a Garden Hose, U.S. Pat. No. 3,667,685 to Rinkewich for Irrigation Devices, U.S. Pat. No. 2,196,456 to Charroin for Group Sprinkling Apparatus, U.S. Pat. No. 2,628,865 to Duncan for Flexible Sprinkler Unit, U.S. Pat. No. 3,693,657 to Olson for Flow Restrictor with Flushing Means, U.S. Pat. No. 3,693,888 to Rondas et al for Fluid Emitter, U.S. Pat. No. 3,729,142 to Rangel-Garza et al for Drippers for Irrigation, U.S. Pat. No. 3,777,980 to Allport for Irrigation Fitting, U.S. Pat. No. 4,037,791 to Mullett et al for Flow-Control Device, U.S. Pat. No. 3,467,142 to Boyle for Flow Device and Method of Manufacture Thereof, and U.S. Pat. No. 3,901,448 to Babin for Irrigation System Emitters with Renewable Filters.

The Mock patent (U.S. Pat. No. 3,903,929) constitutes one of the most relevant prior art and discloses an irrigation conduit comprising first and second integral tubes connected by a common wall separating their interiors. A first series of holes extends through the common wall so as to connect the interiors of the tubes. A second series of hole connects the interior of the second tube with the exterior of the conduit. Both the first and second series of holes are obstructed when suspended solids are present in the irrigation water. Filtering the irrigation water prior to its use in the conduit minimizes the obstructions but adds to the costs and is not always feasible.

Boyle (U.S. Pat. No. 3,467,142) is another pertinent patent and discloses an irrigation hose with a plurality of parallel flow passages. At column 3, line 73–column 4, line 2, Boyle teaches the use of a copper wire in a flow passage for the purpose of repressing growth and accumulation of microscopic organisms in the passage.

SUMMARY OF THE INVENTION

An object of the present invention is to provide new and improved irrigation apparatus. More specifically, an objective of the present invention is to provide irrigation apparatus which may be easily and conveniently produced at a comparatively nominal cost which may be easily installed with a minimum of difficulty in the location where it is to be used, which may be easily and conveniently employed for irrigation purposes, which is capable of giving prolonged, effective, reliable service in irrigating plants or crops, and which can be utilized in such a manner as to obtain effective water utilization.

A feature of the present invention is the non-restrictive series of first holes. The first holes in other devices cause a pressure drop as water is distributed from the interior of the primary tube to the interior of the secondary tube.

Another feature of the present invention is the use of one or more filamentary lines to form a restricted path for water flowing from a first hole to a second hole.

Another object of the present invention is to provide an apparatus for distributing irrigation water and the like which is easy to remove after it is no longer desired in its original location.

Another object of the present invention is to provide an apparatus for distributing irrigation water and the like which will readily apply the irrigation water at low rates, thereby conserving scarce water supplies.

Another object of the present invention is to provide an apparatus for distributing irrigation water and the like which is readily cleared by accumulated silt, if necessary.

Another object of the present invention is to provide an apparatus for distributing irrigation water and the like which will compensate for varying pressures in the water supply, such that a pressure increase does not produce a corresponding flow increase.

Another object of the present invention is to provide an apparatus for distributing irrigation water and the like which will automatically flush or blow out obstructions.

Another object of the present invention is to provide an apparatus for distributing irrigation water and the like which will automatically flush or blow out each time the water is turned on.

Another object of the present invention is to provide an apparatus for distributing irrigation water and the like which may be easily manufactured at low cost.

Another object of the present invention is to provide such an apparatus incorporating a smooth monofilament plastic line having a density approximately that of water, for improved clearing of obstructions.

In accordance with this invention, these and various other related objectives of the invention as will be apparent from a detailed consideration of this entire specification, are achieved by a multiple chamber drip irrigation hose having a primary and at least one secondary tube of flexible, water-impermeable material and joined at a common wall. Said common wall has a series of first holes placing the interior of said primary tube in communication with the interior of said secondary tube. Said secondary tube has a series of second holes leading from the interior of said secondary tube to the exterior. A flexible filamentary line is positoned within said secondary tube and forms a restricted path for water flowing from a first hole to a second hole.

Optionally, at least one tertiary tube is joined to said secondary tube at a second common wall, with said second holes through said second common wall. Said tertiary tube has a series of third holes leading from the interior of said tertiary tube to the exterior. A flexible, filamentary line is positioned within said tertiary tube and forms a restricted path for water flowing from a second hole to a third hole.

BRIEF DESCRIPTION OF THE DRAWINGS

This apparatus is intended to be utilized in conveying and distributing irrigation water under pressure from a conventional conduit or source of such water as indicated in subsequent portions of this specification and is illustrated in the accompanying drawings.

From a consideration of the remainder of this specification and of the drawings it will be realized that the illustrated irrigation hose is not the present invention itself, but is a specific structure embodying the essential features or concepts of the present invention. Such features or concepts are defined or summarized in the appended claims. They may be utilized within a number of structures which may differ significantly in appearance from one another.

DESCRIPTION OF THE PREFERRED EMBODIMENT

Figure 1:
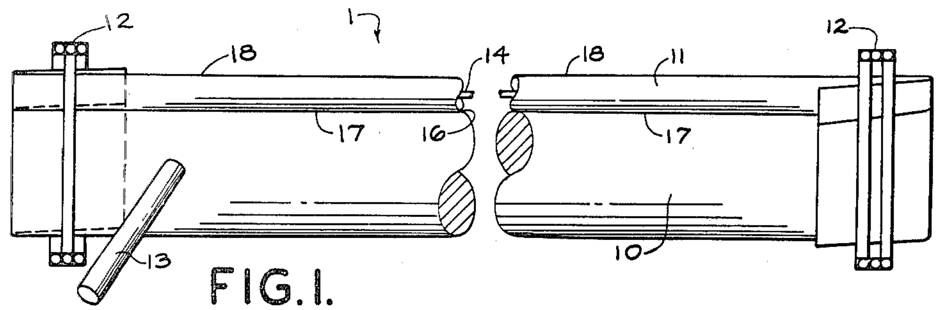
FIG. 1 is a side elevational view of a length of a presently preferred multiple chamber drip irrigation hose in accordance with this invention, this view indicating in a diagrammatic manner the utilization of this hose.
Figure 8:
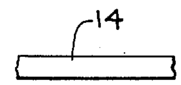
FIG. 8 is a partial cross-sectional view of an enlarged portion of the monofilament line 14 of FIG. 1.

Illustrated in FIGS. 1 and 8 is a hose 1 for distributing irrigation water and the like formed of flexible, water-impermeable material, such as a plasticized polyvinyl chloride, a common polyethylene or the like. The hose 1 is an integral unit consisting of a continuous length of such material. The hose 1 may be conveniently formed at a reasonable cost by conventional plastic extrusion techniques, or by sealing a continuous sheet of plastic film with heat and pressure or glue.

The hose 1 has a primary tube 10 and a secondary tube 11 of flexible, water-impermeable material joined at a common wall 16. The common wall 16 has a series of first holes 17 placing the interior of the primary tube 10 in communication with the interior of secondary tube 11. The secondary tube 11 has a series of second holes 18 leading from the interior of the secondary tube 11 to the exterior. A smooth, flexible, filamentary line 14 of monofilament having a density approximately that of water is positioned within the secondary tube 11 and forms a restricted path for water flowing from a first hole 17 to a second hole 18.

In normal use, the ends of the hose 1 are closed by conventional water-tight clamps 12 which seal both the primary and secondary tube. The interior of the primary tube 10 is connected to a source of pressurized irrigation water by a flexible tube 13. The ends of the hose 1 may be closed off by plugs, sealed by heat and pressure or other devices. Clamps 12 are preferred for convenience type reasons.

Figure 2:
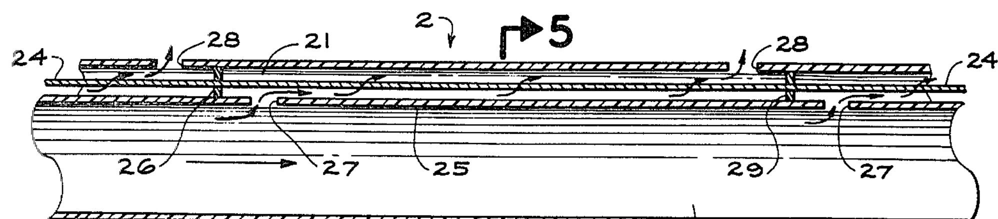
FIG. 2 is a partial cross-sectional view of a length of a first alternate embodiment of the hose of the present invention.
Figure 5:
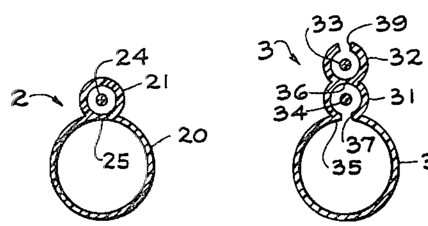
FIG. 5 is a cross-sectional view taken at line 5—5 of FIG. 2.

FIGS. 2 and 5 refer to a first alternate embodiment of the present invention. The hose 2 has a primary tube 20 and a secondary tube 21. The primary tube 20 is joined to the secondary tube 21 by a common wall 25. A plurality of uniformly spaced barriers 26 and 29 within the secondary tube 21 from a plurality of chambers. Positioned within the secondary tube 21 is a monofilament line 24. In this embodiment, the number of first and second holes preferably are equal. The number of either first or second holes plus one is preferably equal to the number of barriers, since the sealed ends serve as barriers at each end. Located in the common wall 25 is a series of first holes 27. Each first hole 27 is located adjacent one barrier 26. A series of second holes 28 is located in the secondary tube 21 adjacent the next barrier 29. The water flows through the primary tube 20 past a first hole 27 into the secondary tube 21 which forms a chamber and out a second hole 28. Optionally, a tertiary tube having chambers like those of the secondary tube may be employed.

Figure 3:
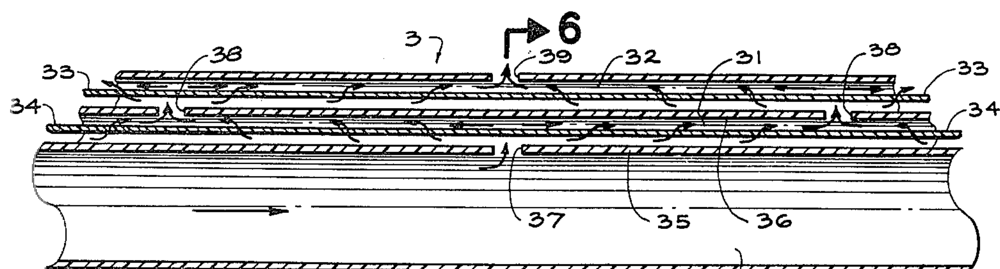
FIG. 3 is a partial cross-sectional view of a length of a second alternate embodiment of the hose of the present invention.
Figure 6:
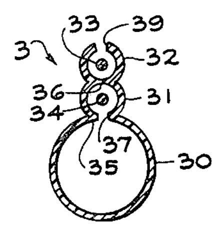
FIG. 6 is a cross-sectional view taken at line 6—6 of FIG. 3.

FIGS. 3 and 6 illustrates a second alternate embodiment of the hose 3. The hose 3 has a primary tube 30, a secondary tube 31 and a tertiary tube 32. Positioned within the secondary tube 31 is a first monofilament line 34. Positioned within the tertiary tube 32 is a second monofilament line 33. The primary tube 30 is joined to the secondary tube 31 by a first common wall 35. The secondary tube 31 is joined to the tertiary tube 32 by a second common wall 36. Located in the first common wall 35 is a series of first holes 37 placing the interior of the primary tube 30 in communication with the interior of the secondary tube 31. Located in the second common wall 36 is a series of second holes 38 placing the interior of the secondary tube 31 in communication with the interior of the tertiary tube 32. Located in the tertiary tube 32 is a series of third holes leading from the interior of the tertiary tube 32 to the exterior.

Figure 4:
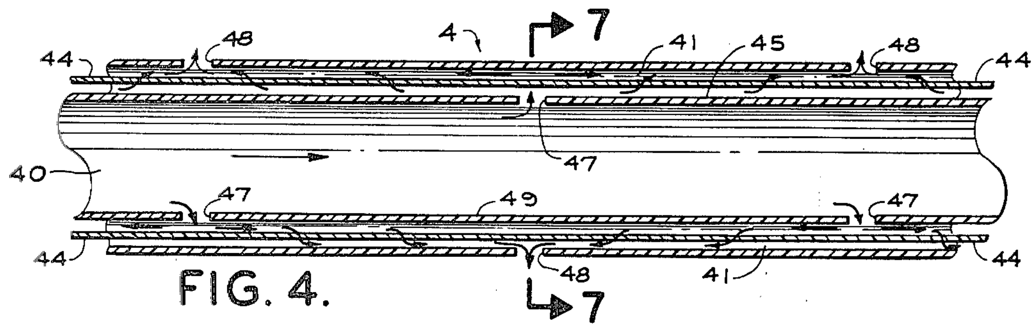
FIG. 4 is a partial cross-sectional view of a length of a third alternate embodiment of the hose of the present invention.
Figure 7:
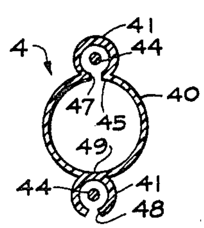
FIG. 7 is a cross-sectional view taken at line 7—7 of FIG. 4.

FIGS. 4 and 7 illustrate a third alternate embodiment of the hose 4. The hose 4 has a primary tube 40 and two secondary tubes 41 joined to the primary tube 40 by a first common wall 45 and a second common wall 49. The first and second common walls 45 and 49 each have a series of first holes 47 placing the interior of the primary tube 40 in communication with the interior of each secondary tube 41. The secondary tubes 41 each have a series of second holes 48 leading from the interior of the secondary tube 41 to the exterior. A flexible, filamentary line 44 is positioned within each secondary tube 41 and forms a restricted path for water flowing from a first hole 47 to a second hole 48. This third embodiment is similar to the embodiment in FIG. 1, but having secondary tubes whereas FIG. 1 has a single secondary tube.

Figure 9:
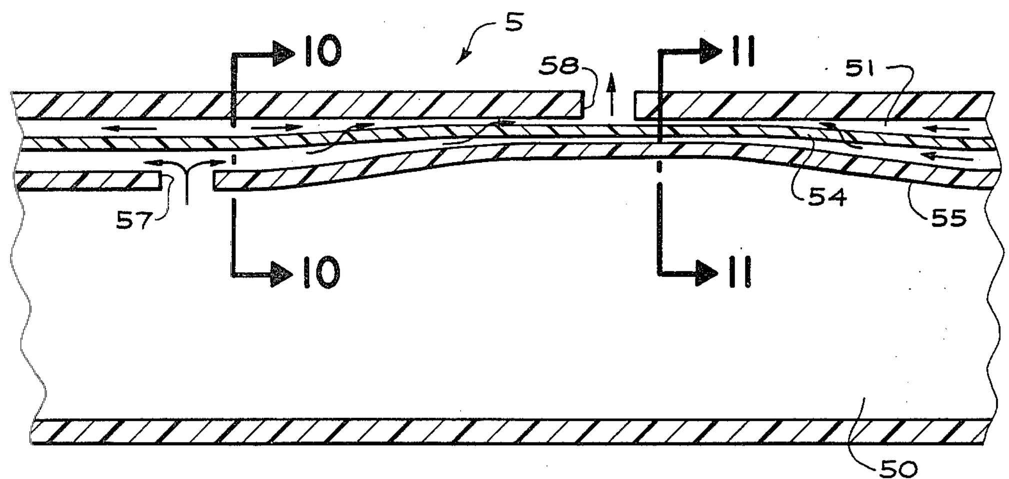
FIG. 9 is a partial cross-sectional view of a length of a fourth alternate embodiment of the hose of the present invention.
Figure 10:
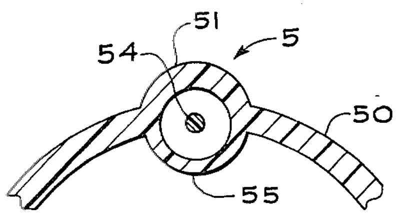
FIG. 10 is a partial cross-sectional view taken at line 10—10 of FIG. 9.
Figure 11:
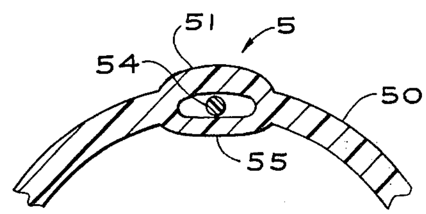
FIG. 11 is a partial cross-sectional view taken at line 11—11 of FIG. 9.

FIGS. 9, 10 and 11 illustrate a fourth alternate embodiment of the hose 5. The hose 5 has a primary tube 50 and a secondary tube 51 joined to the primary tube by a common wall 55. The common wall 55 is reduced in thickness to allow the secondary tube to be more readily flattened or "oil-canned" where there is an increase in water pressure in the adjacent primary tube 50. Positioned within the secondary tube 51 is a monofilament line 54. Located in the common wall 55 is a series of first holes 57 placing the interior of the primary tube 50 in communication with the interior of the secondary tube 51. The secondary tube has a series of second holes 58 leading from the interior of the secondary tube 51 to the exterior.

Figure 12:
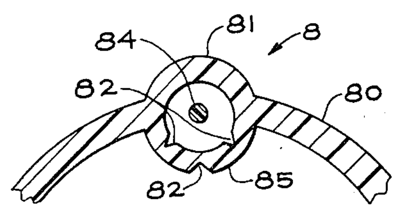
FIG. 12 is a partial cross-sectional view of a fifth alternate embodiment of the hose of the present invention.

FIG. 12 illustrates a fifth alternate embodiment of the hose 8. The hose 8 has the same structural features as hose 5 but the common wall 85 has a plurality of grooves 82 extending along the upper and lower surfaces to facilitate "oil-canning" or flattening of the secondary tube 81. Also shown are the primary tube 80 and the monofilament line 84.

The various figures of the drawings illustrate the structural relationships between the elements of the hose. The various elements are not all drawn to the same scale. For example, the various series of holes are all quite small and may not be clearly seen if drawn to scale. The secondary tube has also been enlarged to show the details of its construction. The filamentary line has been shown as a monofilament, althought it may be either a multifilament or yarn.

When the pressure of the water supplied is sufficiently great, so long as that pressure does not exceed the rupture strength of the material, such pressure will tend to stretch the primary tube 10 so as to produce a cross-orientation in a circular direction. This will overcome any orientation which may have resulted from the fabrication of the hose 1. This action is considered to be beneficial in holding down manufacturing and material costs. The result is a hose which can withstand comparatively high pressure without rupture.

The series of first holes are non-restrictive and do not create a pressure drop between the primary tube and the secondary tube. The series of second holes may be either restrictive or non-restrictive. Both series of holes are preferably spaced from one another at periodic intervals such as about one every two feet to about one every five feet. The term holes includes a single circular opening, a plurality of circular openings, a single slot and a plurality of slots. The cross-sectional area of the second and third holes may or may not be uniform. The uniformity of the holes will aid in maintaining a uniform pressure gradient with water pressure of a given value. The holes may be created either by heat or mechanical action.

The flexible, filamentary lines which are positioned within the secondary and tertiary tubes create turbulence in the water flowing from the first holes to the second holes, and, when present, from the second holes to the third holes. The line is a smooth, flexible monofilament plastic having a density approximately that of water. The flexible filamentary line also enables one to more readily remove the apparatus from its original location by increasing its strength. The flexible line also enables one to clear silt from the holes of the hose by pulling the line back and forth. Generally the line is an extruded plastic material, such as a polyester, polyethylene, polypropylene, or nylon.

Water has a density of about 1 gram per cubic centimeter, and the plastic materials have a density in the range of about 0.7 to 2 grams per cubic centimeter. This is in contrast to iron, copper and aluminum which have densities of about 7.6, 8.9 and 2.7 grams per cubic centimeters, respectively. The expression "density approximately that of water" as used herein is intended to include plastics in the range of about 0.7 to 2 grams per cubic centimeter and preferably in the range of about 0.9 to 1.5 gram per cubic centimeter, while excluding the metals. Nylon, the presently preferred material, has a density in the range of 0.95–1.05.

Tests using smooth copper wire (both hard and soft copper) and smooth polyethylene plastic as the monofilament line have been performed.

It has been determined that soft or hard monofilament copper wire of 0.005" to 0.010" diameter when inside plastic tubing, will keep tubing of 0.030" and 0.040" I.D. from straightening out even at a water pressure of 20 psi in the tubing. This is not so with the monofilament plastic line in the tubing.

A dirty water experiment was performed using a supply bucket of water with dirt in it at a raised elevation of 10 ft. (3 psi). Stirring the water at different rates gives a varying amount of dirt suspended in the water entering a supply hose leading to the drip irrigation hose. The dirty water was directed through tubing with copper wire and tubing with plastic line therein, connected in series. In every test it is found the tubing with copper wire plugs up so that the flow of water is significantly reduced (to less than ½) and sometimes the flow is but an occasional drop. This occurs with the plastic and copper filaments in series. In contrast the tubing with the plastic filament does not plug up whether before or after the tubing with the copper filament.

Filaments of 0.005", 0.010" and 0.015" OD and of 0.030" and 0.040" ID were used in the tests.

The tests establish that the copper is too heavy, while the plastic, being about the same specific gravity as water, moves and oscillates with the water as it changes direction of flow due to a piece of dirt or buildup of silt. The free movement of the plastic filament influences the release of the piece of dirt or silt. The copper line remains stationary or substantially stationary in the tubing, and proves to be a good plugging design, hardly a suitable irrigation device.

Although it is possible to utilize the hose to that it is normally exposed to ambient air, it is considered preferable to bury the hose so that it is under the surface of the ground. The hose may be readily installed under the surface of the ground by dropping it in a ditch or unreeling it into a furrow behind a plow or similar structure being moved over a field. One advantage of the present invention is the fact that the apparatus can be easily and cheaply removed from the field by pulling on one of its ends at the end of the growing season so that the field may be recultivated for use.

When the pressure compensating type multiple chamber drip irrigation hose is employed, an increase in water pressure in the primary tube causes a flattening or "oil-canning" in the adjacent secondary tube. The higher the pressure, the more the water passage in the secondary tube is reduced, providing for a constant water flow with varying pressure. The flattening or "oil-canning" reduces the volume of the secondary tube but due to the higher pressure the rate of water flow remains constant. The higher the water pressure in the primary tube, the greater the force causing the reduction in volume of the secondary tube as it flattens or "oil-cans" more and more. When the water pressure in the primary tube returns to normal, the shape of the secondary tube returns to its former dimension which increases its volume allowing the water flow from the secondary tube to remain relatively constant. This expansion and contraction of the secondary tube has the effect of releasing particles from adhesion to the inner walls of the secondary tube, which would otherwise build up and block the tube. The undistorted cylindrical shape of the secondary tube has the greatest volume for a given amount of wall area. Any deviation from the cylindrical form will reduce the volume of the secondary tube. When one of the holes of the second series plugs up, there is an increase in pressure in the adjacent secondary tube which automatically blows out the obstruction. The full pressure blow-out or flushing feature also occurs automatically each time the water is turned on, just before the common wall "oil-cans" or flattens into the compensating mode, due to the water pressure gradient as the full water pressure builds up.

It may be convenient in the manufacturing process to produce a hose of other than the precise shape or configuration illustrated. For example, the primary tube may be extruded so as to have an oval shape to facilitate its being taken up on a spool or the like. Such changes also facilitate storage and handling. When a tube is formed in this manner, it will normally assume a circular cross-sectional configuration as significant pressure is applied to its interior.

The first alternate embodiment of the present invention allows for a relatively large pressure drop in a simple system by forcing the water to flow through an elongated chamber formed in the secondary tube. The series of first holes should be as close as possible to the left side of the barrier and the series of second holes should be as close as possible to the right side of the adjacent next barrier so as to form a pathway of the maximum length within each chamber of the secondary tube.

The second alternative embodiment employing a primary, a secondary and a tertiary tube may be used to lengthen the run of the hose and to accommodate a higher water pressure.

It is contemplated that embodiments employing higher orders than three levels of tubes are within the scope of this invention. These higher level embodiments are merely an extension of the principles illustrated herein.

The third alternate embodiment of the present invention illustrates the use of two secondary tubes. More than two secondary tubes may be employed if so desired without departing from the scope of the present invention. The embodiment illustrated in FIG. 1 would be half of that illustrated in FIGS. 4 and 7. The secondary tubes may be placed in any relationship to one another which may be fabricated.

The fourth and fifth alternate embodiments of the present invention illustrate the use of the compensating multiple chamber drip irrigation hose. These embodiments were employed where a constant flow rate through the outlet is desired regardless of the pressure of the water supply. Thus, this type of hose may be used to go up and down hills while the flow rate remains constant. Such hoses may also be made in greater lengths than non-compensating hoses, since they are able to compensate for a greater water pressure gradient.

The compensating type hose is produced by extruding an "airplane" web with a filament in the fuselage. The lower portion of the fuselage is either thinner than the upper portion or contains a plurality of grooves on both surfaces to allow the fuselage, which forms the secondary tube of the hose, to flatten, or "oil-can" when the water pressure increases on its adjacent outer surface, which is the common wall. The hose is then slotted on both the lower and upper portions of the secondary tube or fuselage forming the holes of the first and second series. The wings are then folded over and sealed together to form the primary tube of the hose.

Alternatively, the compensating type hose may be made by extruding a primary tube, placing the first series of holes in the primary tube, extruding a ribbon and placing the second series of holes on the ribbon, and gluing the ribbon over the first series of holes to form a secondary tube.

When the hose is constructed from a film, the film usually ranges from about 0.004" to 0.008" in thickness. The film may be sealed with a conventional sealing wheel using heat and pressure, or the film may be glued.

When the hose is to be constructed with heavier walls, it is generally produced by extruding the plastic on conventional equipment. The walls of the extruded hose are generally greater than 0.014" in thickness. The hose may be extruded in a finished form or as an "airplane" web which is subsequently sealed to form a hose. A typical multiple chamber drip irrication hose has a primary tube of about $\frac{5}{8}$ of an inch in diameter when fully distended by irrigation water at a pressure of about 15 pounds per square inch. The interior of the secondary tube is about 0.040" in diameter. The series of first holes are non-restrictive and located at five foot intervals. The series of second holes are 0.015" in diameter, located at five foot intervals and are offset from the series of first holes. A monofilament line 0.015" in diameter is positioned within the secondary tube. At a water pressure of about 15 pounds per square inch in the primary tube, each second hole will discharge about one gallon of water per hour. A desirable rate of application of irrigation water for row crops is about one gallon per foot per row per day.

The rate of water flow may be changed by: Varying the water pressure entering the system, varying the cross-sectional area of the secondary tubes, varying the diameter of the flexible filamentary line, varying the spacing of the holes, varying the diameter of the varying pressure chamber in the compensating type hose, increasing the bulk of a multifilament line, and by varying the length of the path of the fluid flow in the secondary tubes.

Although the irrigation hose is primarily designed for the dispensing of irrigation water, it is contemplated that systemic fertilizers, pesticides and/or herbicides may be ad-mixed with irrigation water and applied at the same time. It is contemplated that due to the efficient application of water to the desired root zone with this hose that it may also be more economical to apply fertilizers, insecticides, pesticides and/or herbicides in this manner, since the materials are efficiently used as well as applied with a minimum amount of labor. Metering equipment such as that which may be employed in the application of the irrigation water can be used to control the amount of material applied.

I claim:

1. A multichamber drip irrigation hose for distributing irrigation water and the like in controlled amounts, comprising:

a primary and at least one secondary tube of flexible, water-impermeable material and joined at a common wall;

said common wall having a series of first holes placing the interior of said primary tube in communication with the interior of said secondary tube;

said secondary tube having a series of second holes leading from the interior of said secondary tube to the exterior; and a smooth, flexible, filamentary line of a material having a density approximately that of water and positioned within said secondary tube and forming a restricted path for water flowing from a first hole to a second hole, said line being of substantially smaller diameter than said secondary tube for movement of said line radially in said secondary tube.

2. The hose of claim 1 wherein the first holes are non-restrictive, being sufficiently large so as to provide substantially no pressure drop between said primary and secondary tubes.

3. The hose of claim 1 wherein the second holes are non-restrictive, being sufficiently large so as to provide substantially no pressure drop between said secondary tube and the exterior.

4. The hose of claim 1 wherein two secondary tubes are joined to the primary tube by a first and second common wall;

said first and second common walls each having a series of first holes placing the interior of said primary tube in communication with the interior of each of said secondary tubes;

said secondary tubes each having a series of second holes leading from the interior of said secondary tube to the exterior; and a smooth, flexible, filamentary line of a material having a density approximately that of water and positioned within each of said secondary tubes and forming a restricted path for water flowing from a first hole to a second hole, each of said lines being of substantially smaller diameter than the corresponding secondary tube for movement of the line radially in the tube.

5. The hose of claim 1 wherein the holes of the first and second series have the same spacing, and the holes of said second series are offset from the holes of said first series.

6. The hose of claim 1 including:

a plurality of barriers within said secondary tube forming a plurality of chambers with each chamber having a first hole and a second hole; and with said first hole of said chamber located adjacent one barrier and said second hole of said chamber located adjacent the next barrier.

7. The hose of claim 6 wherein said barriers are formed by sealing a portion of said secondary tube to itself.

8. A multichamber drip irrigation hose for distributing irrigation water and the like in controlled amounts, comprising:

a primary and at least one secondary tube of flexible, water-impermeable material and joined at a first common wall;

at least one tertiary tube of flexible, water-impermeable material attached to said secondary tube at a second common wall;

said first common wall having a series of first holes placing the interior of said primary tube in communication with the interior of said secondary tube;

said secondary tube having a series of second holes placing the interior of said secondary tube in communication with the interior of said tertiary tube;

said tertiary tube having a series of third holes leading from the interior of said tertiary tube to the exterior;

a first smooth, flexible, filamentary line of a material having a density approximately that of water and positioned within said secondary tube and forming a restricted path for water flowing from a first hole to a second hole; and a second smooth, flexible, filamentary line of a material having a density approximately that of water and postioned within said tertiary tube and forming a restricted path for water flowing from a second hole to a third hole;

each of said lines being of substantially smaller diameter than its corresponding tube for movement of the line radially in the tube.

* * * * *